E. C. FLORIOT.
ELECTRIC TOASTER.
APPLICATION FILED NOV. 5, 1921.
1,416,272.
Patented May 16, 1922.
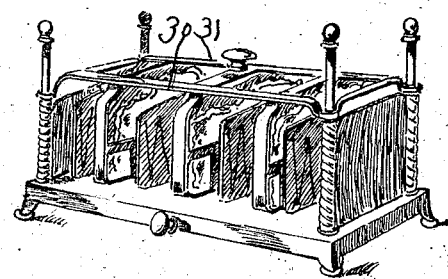
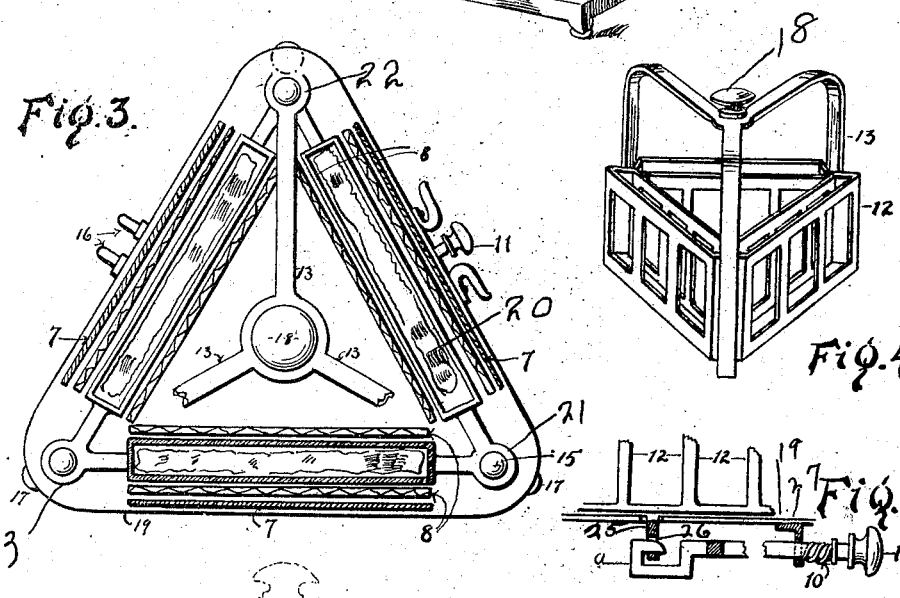
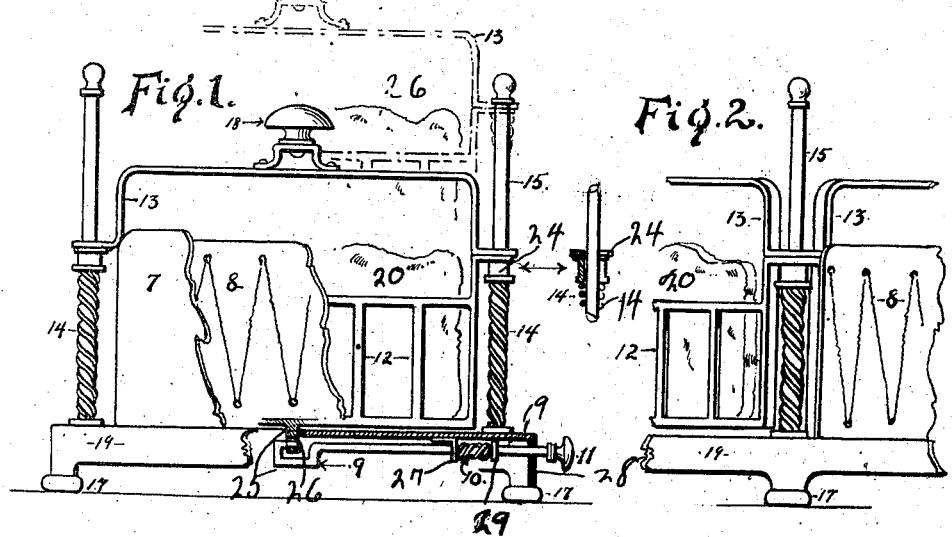
INVENTOR
Edmond C. Floriot
BY
Dodson and Roe
ATTORNEYS

UNITED STATES PATENT OFFICE.

EDMOND C. FLORIOT, OF NEW YORK, N. Y.

ELECTRIC TOASTER.

1,416,272.  Specification of Letters Patent.  Patented May 16, 1922.

Application filed November 5, 1921. Serial No. 512,978.

*To all whom it may concern:*

Be it known that I, EDMOND C. FLORIOT, a citizen of the United States, residing at New York, in the county and State of New York, have invented a certain new and useful Improvement in Electric Toasters, of which the following is a specification.

My invention relates to that class of toasters in which the heating element is applied to both sides of the bread which is to be toasted at the same time, and has for its object to construct a device of this type in which the heat will be conserved to a large degree, and to provide means which, when manually released, will automatically remove the bread from the action of the heating element. Other objects of the invention will appear from the hereinafter contained description and claims.

My means of accomplishing the foregoing objects may be more easily understood by having reference to the accompanying drawing, which is hereunto annexed and is part of this specification, in which:

Fig. 1 is a side elevation of my improved device, portions of the construction being broken away to show the interior, and the fragmentary portion being shown in section;

Fig. 2 is a fragmentary detail view of one corner of the device;

Fig. 3 is a top or plan view of the device, part of it being shown in section;

Fig. 4 is a detail view of the toast basket or holder.

Fig. 5 is an enlarged fragmentary detail view of the detent for holding the basket in position, so that the bread will be subject to the action of the heating elements.

Fig. 6 is a modified form of construction.

Similar reference numerals refer to similar parts throughout the entire description.

As shown in the drawings, the device comprises a base 19, preferably formed of sheet metal. As shown, the base is triangular in form and is provided with upright posts 15, located at each of the corners of the triangle. Upon the base and on each side of the triangles, are mounted heating elements 8, which are in spaced relation to each other so as to permit the insertion therebetween of the toast holder or basket 12 which is formed with three compartments corresponding to the sides of the triangle and is provided with straps 13 which extend from a central handle or button 18 and are secured to the toast holder or basket 12. The base is preferably mounted on legs 17 which may be stamped or formed from the sheet metal forming the base 19 or they may be of any suitable or desired construction to give sufficient space underneath the toaster to protect the table upon which it rests from the heat. The toast basket 12 is provided with three outwardly extending lugs 21, 22 and 23 formed at the corners thereof. These lugs are provided with openings which extend through their center and through which the upright posts 16 extend. The lugs rest upon a ferrule 24 which is also mounted and slidable upon the post 15, the lower side of which is contacted by a coil spring 14, which normally holds the toast basket up in the position shown in dotted lines in Fig. 1. The lower part of the toast basket 12 has a downwardly depending lug 25 which as illustrated, is provided with a hole 26, which extends through it and is adapted to be engaged by a hook or detent 9. This hook or detent 9 slides in guides formed in a bracket 27 and a part of the downwardly extending flange 28 of the base 19. A collar 29 is fixedly secured to the shaft of the hook or detent 9, and I mount a coil spring 10 intermediate the collar 29 and the bracket 27. A handle 11 is provided at the outer end of the hook or detent 9 to provide for its convenient manipulation. Outside of the toast basket on each side of the triangle, I provide a plurality of heat deflectors, or crumb shields 7, which prevent the crumbs from getting on to the table and also serve to confine the heat so that it will be conserved to the fullest possible extent in the toast, thus greatly increasing the efficiency of the device.

The operation of the device is as follows:

The bread 20, which is to be toasted is placed in the toast basket and is then pressed downwardly through the medium of the handle 18 compressing, through the medium of the lugs 21, 22 and 23, the coil springs 14 until the lug 25 is brought into register with the hook or detent 9, which is caused to engage the opening 26, formed in the lug 25, the spring 10 serving to hold the hook in engagement therewith. The bread is then in position to be subjected to the heat from the heating elements. When it has toasted sufficiently, by pressing the handle 11 on the outer end of the hook or detent 9, the spring 10 will be compressed thus permitting the disengagement of the hook with the hole 26 in the lug 25. This permits the springs 14 to elevate the toast basket to its normal position, when the toast can be removed and the operation repeated.

In Fig. 6 I have shown a modified form of construction in which the device instead of being formed triangular, is rectangular, and the basket comprises a plurality of toast containing compartments which are suspended from two longitudinally extending straps 30 and 31.

Having described my invention what I regard as new and desire to secure by Letters Patent is:

1. In a toaster, the combination of a base, with a plurality of upright posts mounted thereon, electric heating elements arranged in pairs, a toast basket, lugs on said basket through which said uprights pass, a coil spring on each of said uprights which holds said basket normally in an elevated position, a downwardly depending lug on the bottom of said toast basket, a detent which engages said lug and holds said basket in a depressed position whereby the toast-carrying portions are located intermediate the heating elements.

2. In a toaster, the combination of a base, with a plurality of upright posts mounted thereon, electric heating elements arranged in pairs, each pair being in spaced relationship, a toast basket, lugs on said basket through which said uprights pass, a coil spring on each of said uprights which holds said basket normally in an elevated position, a downwardly depending lug on the bottom of said toast basket, spring pressed means to hold said basket in a depressed position whereby the toast-carrying portions are located intermediate each pair of the heating elements.

3. In a toaster, the combination of a base, with a plurality of upright posts mounted thereon, electric heating elements arranged in pairs, a triangular toast basket, lugs on said basket through which said uprights pass, a coil spring on each of said uprights which holds said basket normally in an elevated position, a downwardly depending lug on the bottom of said toast basket, a detent which engages said lug and holds said basket in a depressed position whereby the toast carrying portions are located intermediate the heating elements.

4. In a toaster, the combination of a base, with a plurality of upright posts mounted thereon, electric heating elements arranged in pairs, a rectangular toast basket, lugs on said basket through which said uprights pass, a coil spring on each of said uprights which holds said basket normally in an elevated position, a downwardly depending lug on the bottom of said toast basket, a detent which engages said lug and holds said basket in a depressed position whereby the toast carrying portions are located intermediate the heating elements.

5. In a toaster the combination of a base with a plurality of upright posts mounted thereon, electric heating elements arranged in pairs, each pair being in spaced relationship, a toast basket, lugs on said basket through which said uprights pass, a coil spring on each of said uprights which holds said basket normally in an elevated position, a downwardly depending lug on the bottom of said toast basket, spring pressed means to hold said basket in a depressed position whereby the toast carrying portions are located intermediate each pair of the heating elements, a crumb shield and heat deflector located at the outer side of each pair of said heating elements.

6. In a toaster, the combination of a base with a plurality of electrical heating unit elements arranged in pairs, the pairs being in spaced relation to each other, a toast basket, spring actuated means to hold said toast basket normally in an elevated position and means to hold said basket in a depressed position whereby the toast-carrying portions are located intermediate the heating elements.

In testimony whereof, I have signed the foregoing specification.

EDMOND C. FLORIOT.